(12) United States Patent
Lutter et al.

(10) Patent No.: US 12,335,058 B2
(45) Date of Patent: Jun. 17, 2025

(54) AUTOMATED GENERATION OF EVENT PARTICIPANT INFORMATION

(71) Applicant: Zoom Communications, Inc., San Jose, CA (US)

(72) Inventors: Jan Lutter, Ahlen (DE); Thanh Le Nguyen, Belle Chasse, LA (US)

(73) Assignee: Zoom Communications, Inc., San Jose, CA (US)

( * ) Notice: Subject to any disclaimer, the term of this patent is extended or adjusted under 35 U.S.C. 154(b) by 59 days.

(21) Appl. No.: 17/726,117

(22) Filed: Apr. 21, 2022

(65) Prior Publication Data
US 2023/0344663 A1 Oct. 26, 2023

(51) Int. Cl.
*H04L 12/18* (2006.01)
*H04L 67/288* (2022.01)

(52) U.S. Cl.
CPC ...... *H04L 12/1818* (2013.01); *H04L 12/1822* (2013.01); *H04L 67/288* (2013.01)

(58) Field of Classification Search
CPC ............. H04L 12/1818; H04L 12/1822; H04L 67/288
See application file for complete search history.

(56) References Cited

U.S. PATENT DOCUMENTS

| | | | |
|---|---|---|---|
| 9,047,483 B2 | 6/2015 | Briere et al. | |
| 9,361,392 B1* | 6/2016 | Saylor | G06F 16/958 |
| 10,445,382 B2 | 10/2019 | Hyatt et al. | |
| 10,805,101 B1* | 10/2020 | Wang | H04L 12/1818 |
| 2005/0222890 A1* | 10/2005 | Cheng | G06Q 10/1095 705/7.19 |
| 2006/0123082 A1* | 6/2006 | Digate | H04L 12/1822 709/205 |
| 2008/0040187 A1* | 2/2008 | Carraher | G06Q 10/1095 705/7.19 |
| 2009/0083105 A1* | 3/2009 | Bhogal | G06Q 10/109 705/7.19 |
| 2009/0083367 A1* | 3/2009 | Li | G06Q 30/02 709/202 |
| 2009/0119299 A1* | 5/2009 | Rhodes | H04L 67/306 707/999.009 |
| 2011/0161454 A1* | 6/2011 | da Fonseca Mendes | H04L 69/329 709/207 |
| 2011/0270926 A1* | 11/2011 | Boyd | G06Q 10/1095 709/204 |
| 2012/0246089 A1* | 9/2012 | Sikes | G06Q 10/1093 705/325 |
| 2012/0304079 A1* | 11/2012 | Rideout | H04L 12/1818 715/758 |
| 2013/0254312 A1 | 9/2013 | Maheshwari et al. | |

(Continued)

*Primary Examiner* — Patrice L Winder
(74) *Attorney, Agent, or Firm* — Young Basile Hanlon & MacFarlane, P.C.

(57) ABSTRACT

A system can automatically search and gather participant information in connection with an event. The search for participant information for a participant is triggered when a positive action for the event is received from the participant. The participant information is gathered from at least one of public, private and software platform resources. The gathered participant information is processed to resolve consistency issues due to the different sources. The resolved participant information is formatted and transmitted to the client devices for display and stored in private resources associated with the participant.

20 Claims, 8 Drawing Sheets

(56) References Cited

U.S. PATENT DOCUMENTS

| | | | |
|---|---|---|---|
| 2015/0379478 A1* | 12/2015 | Klemm | G06F 16/538 |
| | | | 705/7.19 |
| 2016/0092578 A1 | 3/2016 | Ganani | |
| 2016/0352860 A1* | 12/2016 | Deb | H04L 67/306 |
| 2019/0073640 A1* | 3/2019 | Udezue | H04L 12/1818 |
| 2019/0364131 A1* | 11/2019 | Rogynskyy | H04L 12/1831 |
| 2020/0372140 A1* | 11/2020 | Jaber | H04L 12/1822 |
| 2021/0224327 A1* | 7/2021 | Tahiri | G06Q 10/0637 |
| 2022/0014571 A1* | 1/2022 | Polish | H04L 65/1093 |
| 2022/0417050 A1* | 12/2022 | Nagesh | H04L 12/1822 |

\* cited by examiner

AUTOMATED GENERATION OF EVENT PARTICIPANT INFORMATION

FIELD

This disclosure relates to the automated generation of event participant information, and, more specifically, to automatically searching public and private sources for information related to event participants and an associated event and processing same for use by the event participants.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE DRAWINGS

Figure 1:
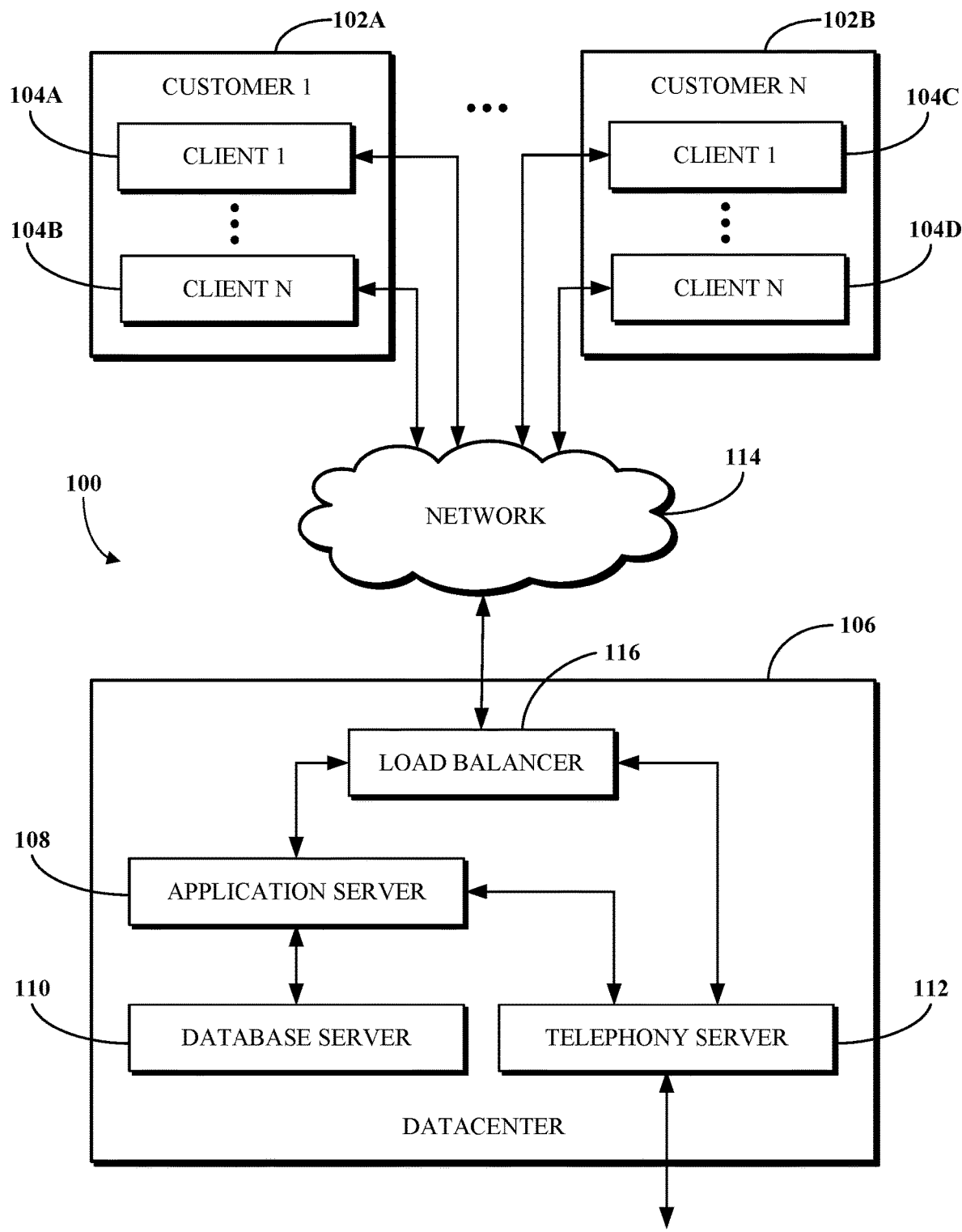
FIG. 1 is a block diagram of an example of an electronic computing and communications system.

Successful and efficient meetings, webinars, events, and conferences (collectively "events") require preparation meetings to ensure all relevant materials and information are ready ahead of time for use by participants of the events. During these preparation meetings, participant information such as contact information, company information, and role are often exchanged using conventional customer resource management (CRM) software packages. This can, however, be an inefficient and cumbersome effort as CRM packages use different formats and technologies. Moreover, these CRM software packages are normally static, out-of-date, incomplete, inaccurate, or inadequate with respect to the participant information. Infrequent updating of the CRM software packages can result in a record, for example, with an incorrect title in the participant information, which can lead to improperly introducing a participant during the event. Improper validation or verification of records in the CRM software packages can lead to, for example, follow-up information being sent to an email address which is incorrectly listed in the participant information.

Implementations of this disclosure address problems such as these by providing systems and methods that automatically search and gather, for an event, participant information from public, service or software platform providers, and private resources, as available, (collectively "resources"). The participants associated with the participant information can include, but are not limited to, organizers of the event, presenters in the event, attendees of the event, and combinations thereof. Participants can opt-in to allow access to their private participant information resources or CRM software packages. In some implementations, search engines can be configurable or optimized, using machine learning techniques, to focus on certain public resources based on frequency of use, accuracy of information, and other factors. Other public resources can be excluded based on resource type, such as a crime database. In some implementations, the automated generation of participant information includes triggering the search for the participant information for a participant when the participant has accepted an invitation to attend the event. In some implementations, the scheduling of the event can trigger the search for participant information for a participant that is a presenter at the event or for a participant that is an organizer of the event. Verification software can be used to address inconsistent search results using, for example, a quorum-based approach. Override control can be provided to an organizing participant or the service platform provider to correct any participant information. The participant information is available to the participants via user interfaces at a device associated with the participant or via a Web interface. The participant information is automatically made available for export into the CRM software packages used by the participants and the service platform provider. The provided participant information is up-to-date and current based on the latest information available on the public and private resources.

In some implementations, scheduling of the event can trigger automated generation of company information associated with an event. For example, the resources can be searched for company logos, company profile, company management, and other company related information. After verification of the company information, the company information can be used to automatically populate information templates associated with the event. For example, if the event is a webinar presented by company X, then the company logo can be inserted into the presentation materials and the company profile can be added to the background section. In some implementations, the company information can be transmitted to an organizer of the event to update the information templates.

To describe some implementations in greater detail, reference is first made to examples of hardware and software structures used to implement a system for automated generation of event participant information. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as a unified communications as a service (UCaaS) platform. Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a UCaaS platform, which includes several communications services integrated over a network, such as the Internet, to deliver a complete communication experience regardless of physical location.

Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information resources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information resources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
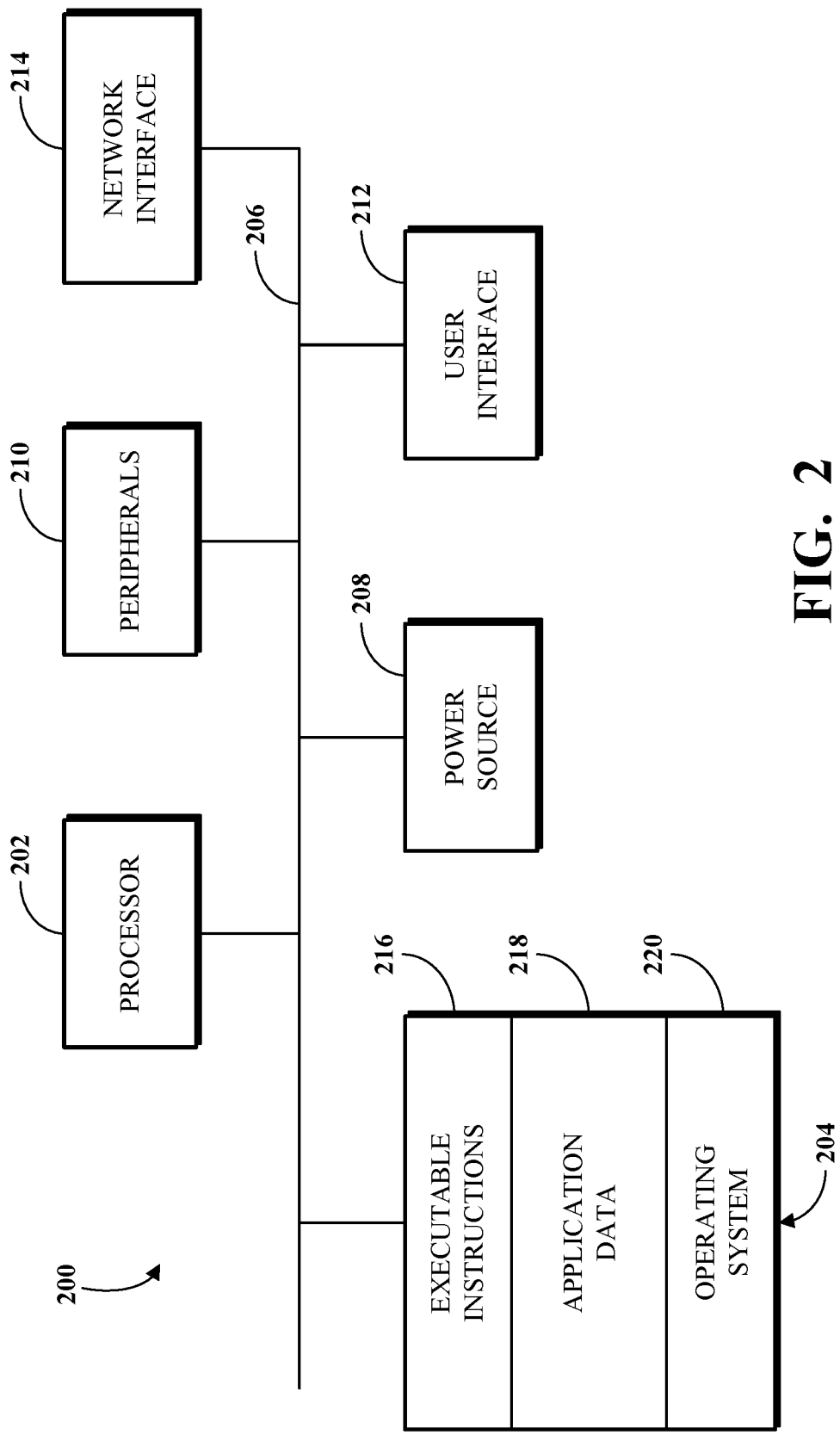
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
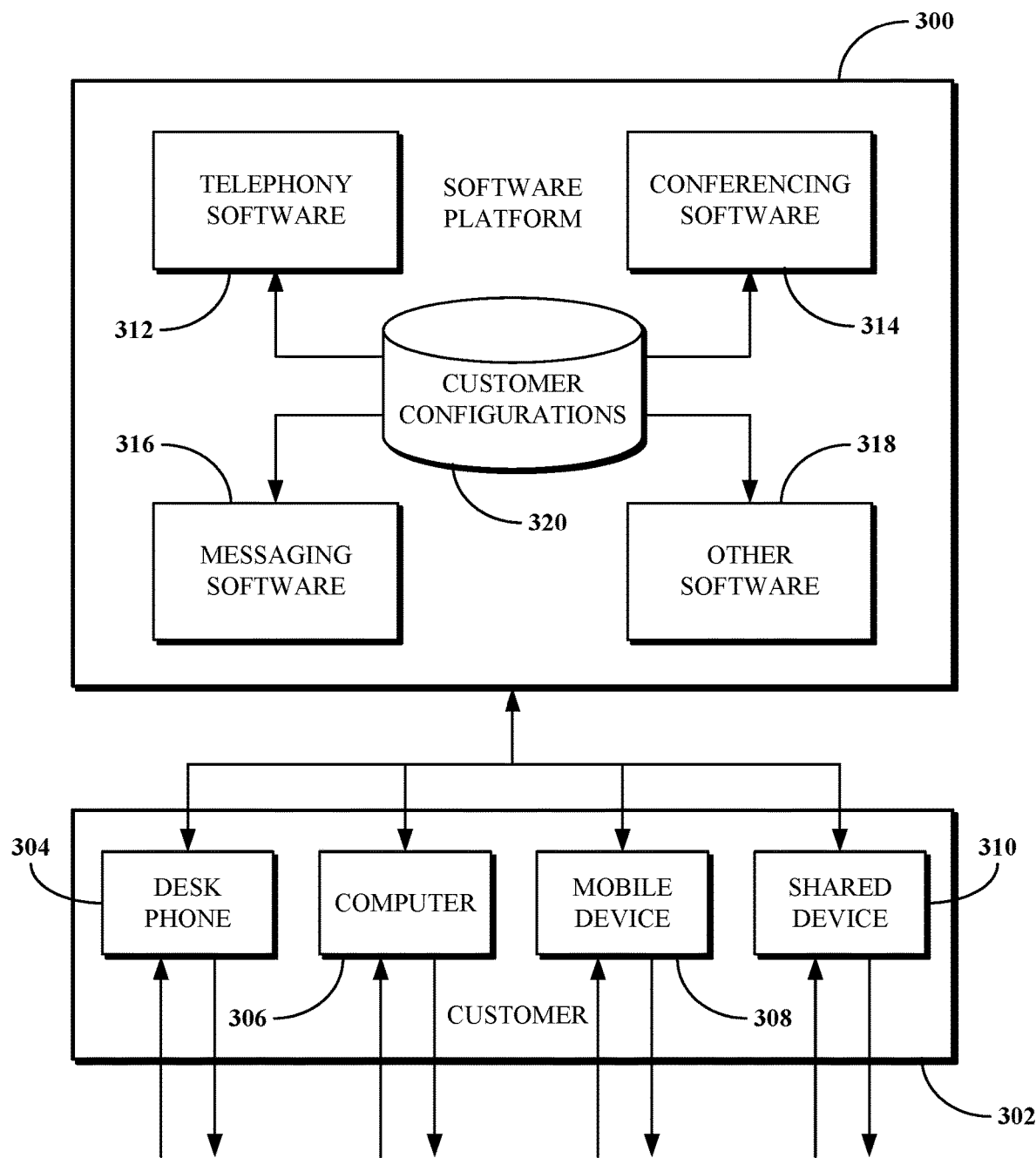
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format. The other software 318 enables other functionality of the software platform 300. Examples of the other software 318 include, but are not limited to, device management software, resource provisioning and deployment software, administrative software, third party integration software, and the like. In one particular example, the other software 318 can include automated participant information generation software for triggering a search for information for a participant when an acceptance is received to a scheduled event from a client device associated with the participant, gathering information about the participant from at least one of public or private resources, resolving consistency of the information gathered from the at least one of public or private resources, and transmitting the information to client devices for display, the client devices associated with participants accepting invitations to the scheduled event.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
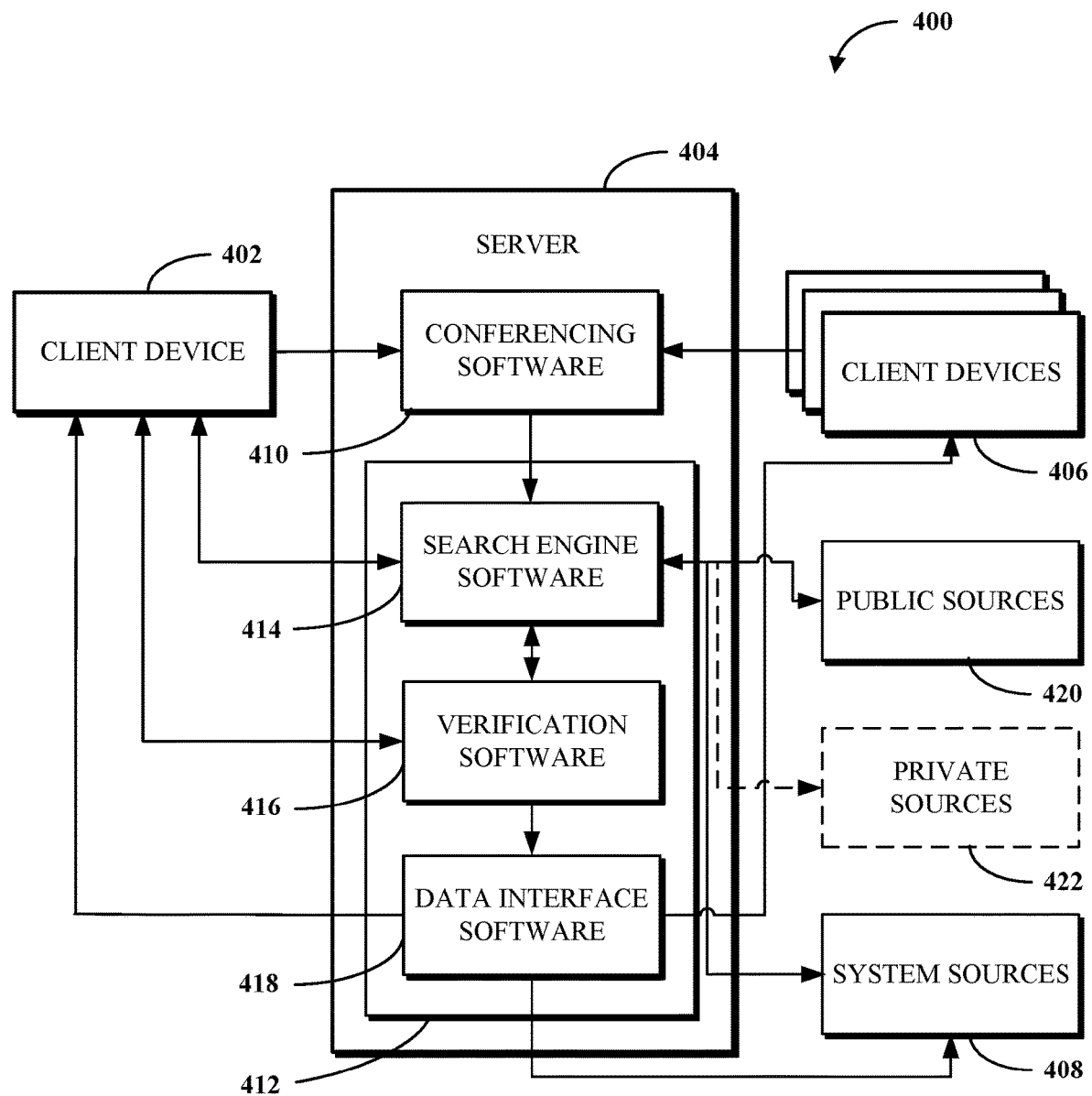
FIG. 4 is a block diagram of an example of a system for automatically generating event participant information.

FIG. 4 is a block diagram of an example of a system 400 for automated generation of event participant information for a participant attending a scheduled event. For example, the participant information can include, but is not limited to, name, identity, company, role, contact information, email address, work experience, education, awards, and other information. The system 400 includes a client device 402, a server 404, client devices 406, and system resources 408. The client device 402 and the client devices 406 may each be any one of the clients 304 to 310 shown in FIG. 3 or similar types of client devices, whether or not corresponding to a customer of a software platform. The server 404 may be used to implement at least a portion of a software platform which implements conferencing functionality, such as the software platform 300 shown in FIG. 3. In an example, the functionality to provide automated generation of event participant information may be implemented in the other software 318 shown in FIG. 3. The system resources 408 may include or otherwise access a database server, such as the database server 110 shown in FIG. 1, that stores participant information of users of the system 400. In some examples, the system resources 408 may be implemented as a component of the server 404.

The server 404 includes conferencing software 410 and automated participant information generation software 412. The conferencing software 410 may, for example, be the conferencing software 314 shown in FIG. 3. The automated participant information generation software 412 may, for example, be implemented in the other software 318 shown in FIG. 3. The automated participant information generation software 412 interfaces with the conferencing software 410 to automatically search for and process information for a participant when a triggering or positive action (collectively "positive action") has been received by the conferencing software 410 from the participant. For example, the positive action can be acceptance of an invitation to attend an event or registration by the participant for an event. The positive action can be understood as an opt-in by the participant to initiate the automated participant information generation. In some implementations, the conferencing software 410 can detect or identify the positive action. For example, the conferencing software 410 can check an event database to identify which participants have replied that they are attending.

The conferencing software 410 is configured to schedule and enable audio, video, and/or other forms of conferences, meetings, webinars, and events (collectively "events") between multiple participants, such as users of the client device 402 and the client devices 406. For example, an event organizer using the client device 402 can send invitations to users of the client devices 406 to attend a conference using the conferencing software 410. In some implementations, the invitations can include an opt-in button or voting action to authorize or enable the automated participant information generation. In another example, an event organizer using the client device 402 can organize and host a webinar using the conferencing software 410. In such an example, the users of the client devices 406 can register to attend the event. In some implementations, the registration can include an opt-in button or checkbox to authorize or enable the automated participant information generation. In yet another example, a school administrator using the client device 402 can arrange a virtual classroom for a course using the conferencing software 410. In such an example, the users of the client devices 406, such as students, can register to attend the course. In some implementations, the course registration can include an opt-in button or checkbox to authorize or enable the automated participant information generation.

The automated participant information generation software 412 is configured to search for information for a participant upon receipt of the positive action, gather information about the participant from public resources, private resources, system resources, or combinations thereof, and verify consistency of the gathered information, and transmit the information to client devices for display, where the client devices are associated with participants accepting invitations to the scheduled event. The automated participant information generation software 412 can include, but is not limited to, search engine software 414, verification software 416, and data interface software 418.

The search engine software 414 is configured to receive a positive action from the client devices 406 via the conferencing software 410. The positive action can be an acceptance to an invitation, a registration for a webinar, a registration from a course, or other actions indicating that a user(s) of the client devices 406 will be a participant in a scheduled event. The search engine software 414 can search for the participant(s) information from public resources 420, private resources 422, if authorized, and the system resources 408. The public resources 420 can include any publicly available platform from which data can be scraped in view or with consideration of legal and privacy rights. In some implementations, the public resources 420 can be networking or business-oriented platforms such as, but not limited to, LinkedIn®, Meetup®, Quora®, Slack®, and Wistia®. In some implementations, the public resources 420 can be social networking platforms such as, but not limited to, Facebook®, Twitter®, Instagram®, WhatApp®, and Reddit®. The system resources 408 can be information maintained by a service provider of the system 400. In some implementations, the search engine software 414 can receive authorization from the event organizer, the host, or an authorized user to search for participant information from a private source 422 associated with the event, the participant(s), a company, a third party, and combinations thereof.

The verification software 416 is configured to resolve any issues or inconsistencies with respect to the participant information found and gathered by the search engine software 414. For example, participant information from a source can indicate that a role of the participant is assistant professor whereas another source can indicate that the role of the participant is professor. In another example, the participant information from a source can indicate that the participant's email address is xyz@abc.edu whereas another source can indicate that the participant's email address is xyz@abc.gov. A number of techniques, as described herein, can be used to resolve inconsistent search results, including, but not limited to, quorum analysis, weighted results, qualitative analysis, and combinations thereof. In some implementations, this intermediate resolved or verified participant information can be sent to a user associated with the client device 402, such as an event organizer or host, to review and override, if appropriate, decisions based on the verification software 416. The override can be sent to the verification software 416 via the client device 402.

The data interface software 418 is configured to send or present the verified participant information to participant(s) to assist in preparation for the event or during the event. In some implementations, the data interface software 418 can send the verified participant information to the participants via the messaging software 316, an update to the invitation, an email, or other mechanisms. In some implementations, presentation of the verified participant information to a participant includes outputting the verified participant information within a user interface of a client application running on a device of the participant, for example, the client device 402 and the client devices 408, as a pop-up window, as a tile, on a command bar, on a menu bar, or combinations thereof. The participant can scroll or search through the verified participant information.

In some implementations, the data interface software 418 is configured to interface with, or communicate with, the system resources 408. The verified participant information is automatically processed and formatted by the data interface software 418 for storing in or populating records in the system resources 408. In some implementations, the data interface software 418 is configured to interface with, or communicate with, the private resources 422, when authorized. The verified participant information is automatically processed and formatted by the data interface software 418 for storing in or populating records in the private resources 422.

In some implementations, the positive action can be the scheduling of the event. In this example, the search engine software 414 can search and gather information regarding a host of an event, an organizer of an event, a presenter at an event, a professor teaching a course, or other similarly situated user of the client device 402. The gathered participant information can be processed by the verification software 416 and output by the data interface software 418 as described herein. The verified participant information can be sent or presented to the host, the organizer, the presenter, the professor teaching a course, or other similarly situated user of the client device 402. In some implementations, this verified participant information can be sent to participants for which the search engine software 414 has received positive actions.

In some implementations, the positive action can be the scheduling of the event. In this example, the search engine software 414 can search for information regarding a company associated with the host, the organizer, the presenter, the professor teaching a course, or other similarly situated user of the client device 402. The gathered company information can be processed by the verification software 416 and output by the data interface software 418 as described herein. In this example, the verified company information can be sent to the host, the organizer, the presenter, the professor teaching a course, or other similarly situated user of the client device 402 for populating information in the event materials such as company logo, company contact information, and other information. In some implementations, the data interface software 418 can automatically process, format, and populate the information in the event materials.

In some implementations, one or more of the users of the client devices 406 can reject an invitation due to a variety of reasons including, but not limited to, illness, out-of-office, conflict, vacation, or combinations thereof. A rejection can be processed as a negative action by the search engine software 414. In some implementations, the conferencing software 410 can detect or identify the negative action. For example, the conferencing software 410 can check an event database to identify which participants have replied that they are attending. In another example, a missing reply to the invitation can be identified as a negative action. In this example, the search engine software 414 can attempt to find and send an invitation to another user as a replacement participant. The search engine software 414 can parse and search the rejection message for information regarding the replacement participant. For example, the rejection message can have company information or refer to another user. The search engine software 414 can also search the system resources 408 for the replacement participant by correlating company information, role, management structure information, and other associative information. The replacement participant(s) can be sent to the event organizer or host, which in turn can send an invitation to a replacement participant.

Figure 5:
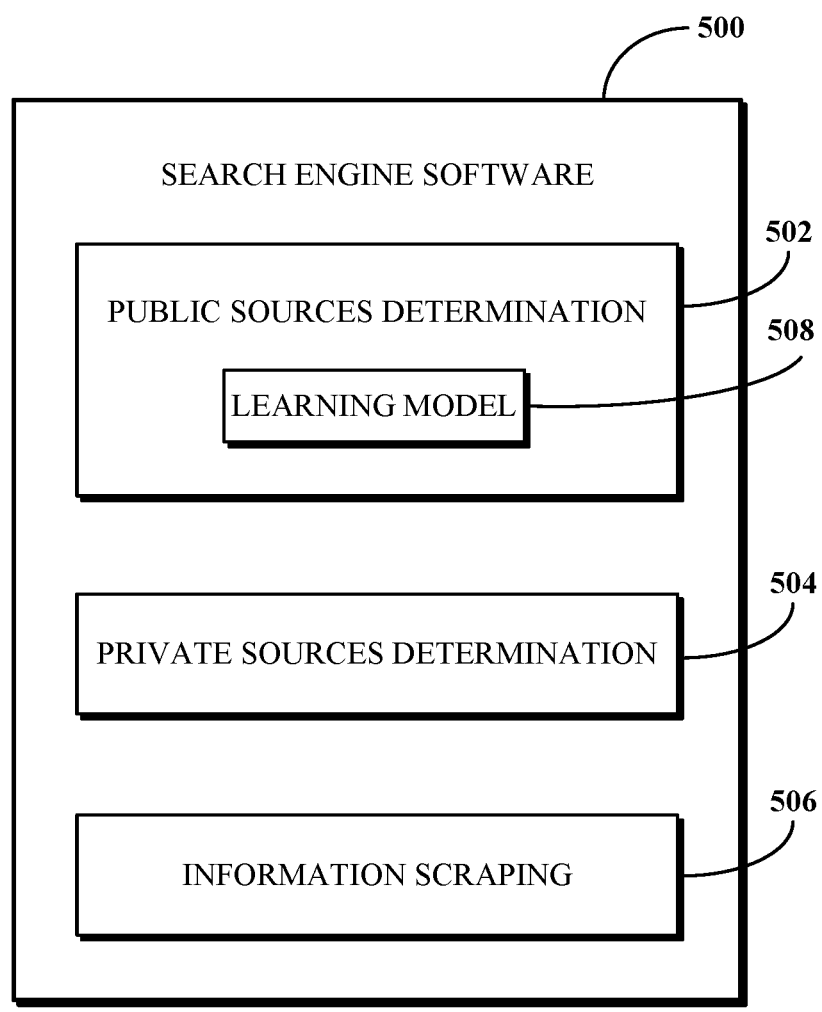
FIG. 5 is a block diagram of example functionality of search engine software.

FIG. 5 is a block diagram of example functionality of search engine software 500, which may, for example, be the search engine software 414 shown in FIG. 4. The search engine software 500 includes tools, such as programs, subprograms, functions, routines, subroutines, operations, and/or the like for searching public resources, authorized private resources, and system resources to gather information on participants associated with an event. In some implementations, the search engine software 500 searches and gathers information on a company associated with the event. As shown, the search engine software 500 includes a public resources determination tool 502, a private resources determination tool 504, and an information scraping tool 506.

The public resources determination tool 502 is configured to determine a set of public resources from which to gather the participant information and the company information. The set of public resources includes the networking or business-oriented platforms, the social networking platforms, organizational databases such as attorney registration information, medical or health databases, and other accessible sources. In some implementations, the set of public resources can exclude law enforcement databases, privacy violating databases, and other similarly situated databases. In some implementations, the public sources determination tool 502 can include and use a machine learning model 508 that is trained to modify the set of public resources based on quality feedback received from the verification software 416. For example, some of the public resources can provide participant information and company information that is more likely to be accurate as opposed to other public resources, information that is more likely to be relevant as opposed to other public resources, information that is more likely to be reliable as opposed to other public resources, information that more frequently provides useable information, or combinations thereof. The machine learning model 508 can direct or focus what public resources are included in the set of public resources in view of under-inclusion and over-inclusion of certain types of public resources. In some implementations, the machine learning model 508 can direct or focus which of the public, private and system resources to search based on accuracy, reliability, and relevancy of the gathered information.

The private resources determination tool 504 can receive information from the user of the client device 402 indicative of authorization to use one or more of the private resources 422. In some implementations, the user of the client device 402 can send a request to a host or company representative to authorize access to the private resource 422 and to export verified participant information once completed.

The information scraping tool 506 can perform the information scraping from resources including the set of public resources 420, authorized private resources 422, and the system resources 408. In some implementations, information is tracked for unresponsive resources, security issues, firewall issues, privacy issues, and other related topics. This information can be fed back to the machine learning model 508 to update the set of public resources as needed.

Although the tools 502 through 506 are shown as functionality of the search engine software 500 as a single piece of software, in some implementations, some or all of the tools 502 through 506 may exist outside of the search engine software 500 and/or the software platform may exclude the search engine software 500 while still including some or all of the tools 502 through 506 in some form elsewhere.

Figure 6:
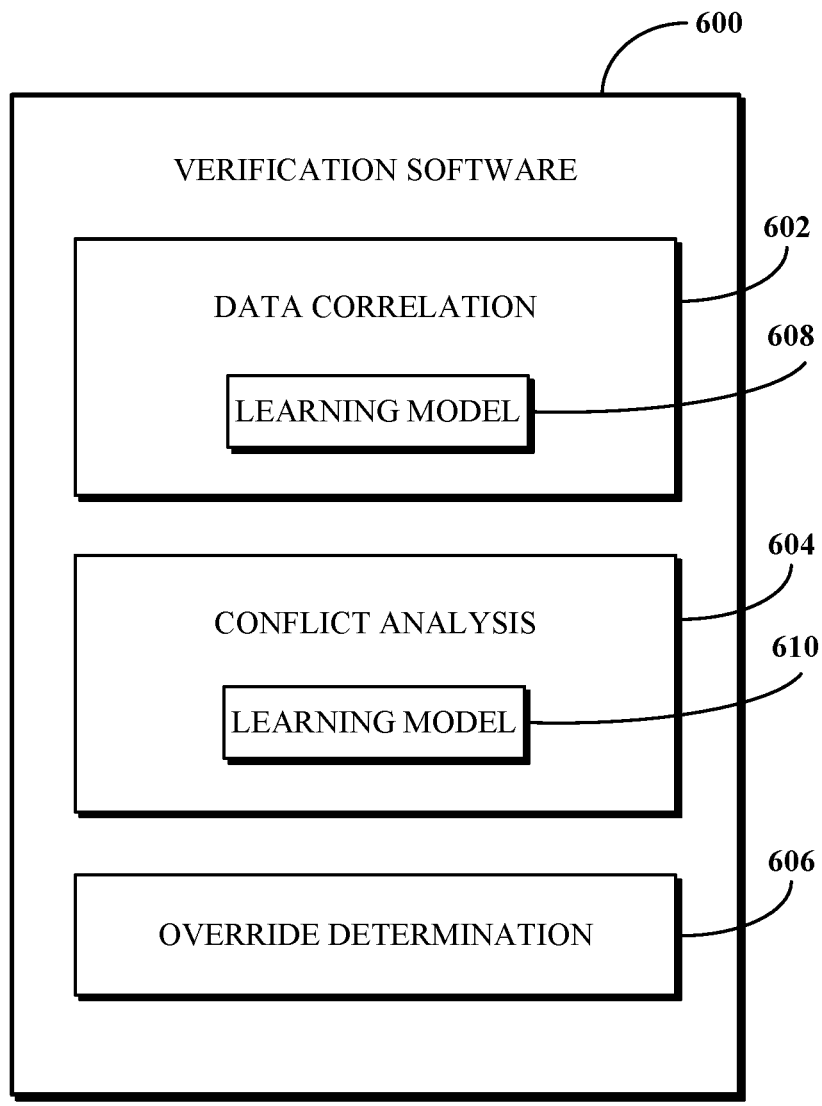
FIG. 6 is a block diagram of example functionality of verification software.

FIG. 6 is a block diagram of example functionality of verification software 600, which may, for example, be the verification software 416 shown in FIG. 4. The verification software 600 includes tools, such as programs, subprograms, functions, routines, subroutines, operations, and/or the like for reconciling conflicting information received from the search engine software 500. As shown, the verification software 600 includes a data correlation tool 602, a conflict analysis tool 604, and an override determination tool 606.

The data correlation tool 602 is configured to parse, analyze, and categorize terms from the gathered participant information, gathered company information, or combinations thereof (collectively "gathered information"). In some implementations, categories can be defined for each type of gathered information. For example, the categories for the gathered participant information can include, but are not limited to, role, address, email address, identity, company, title, previous employment, and education. In another example, the categories for the gathered company information can include, but are not limited to, address, site email address, logo, locations, history, about, stock symbol, and management personnel. The data correlation tool 602 can parse the gathered information and correlate to the proper category. In some implementations, the data correlation tool 602 can include and use a machine learning model 608 that is trained to recognize terminology and categorize appropriately.

The conflict analysis tool 604 is configured to address the issue of multiple entries for a category. For example, the title category for a participant can include associate professor, assistant professor, and professor based on entries from multiple resources. The conflict analysis tool 604 can use a number of techniques to resolve such conflicts. In some implementations, a quorum or majority rules approach can be taken. The terms which appear the most are selected as the correct term for that category. In some implementations, temporal analysis can be done for each term to determine which term is the latest. Each temporally associated term can be used to build a profile for the participant. For some categories, multiple terms can be acceptable. For example, a participant can have multiple telephone numbers. In these instances, each term is provided as alternatives. In some implementations, a combination of one or more of the techniques can be used to resolve a conflict. In some implementations, the conflict analysis tool 604 can include and use a machine learning model 610 that is trained to apply one or more techniques based on the category.

The override determination tool 606 is configured to permit an event organizer, a host, or a similarly situated user (collectively "event organizer") to review categories with conflicts, to preview verified information, or combinations thereof. The override determination tool 606 can send the conflicted categories information, the verified information, or combinations thereof, a link thereto, or combinations thereof to the client device 402 for review by the event organizer. The event organizer can approve, override, correct, or amend, as appropriate.

Although the tools 602 through 606 are shown as functionality of the verification software 600 as a single piece of software, in some implementations, some or all of the tools 602 through 606 may exist outside of verification software 600 and/or the software platform may exclude the search engine software 00 while still including the some or all of tools 602 through 606 in some form elsewhere.

Figure 7:
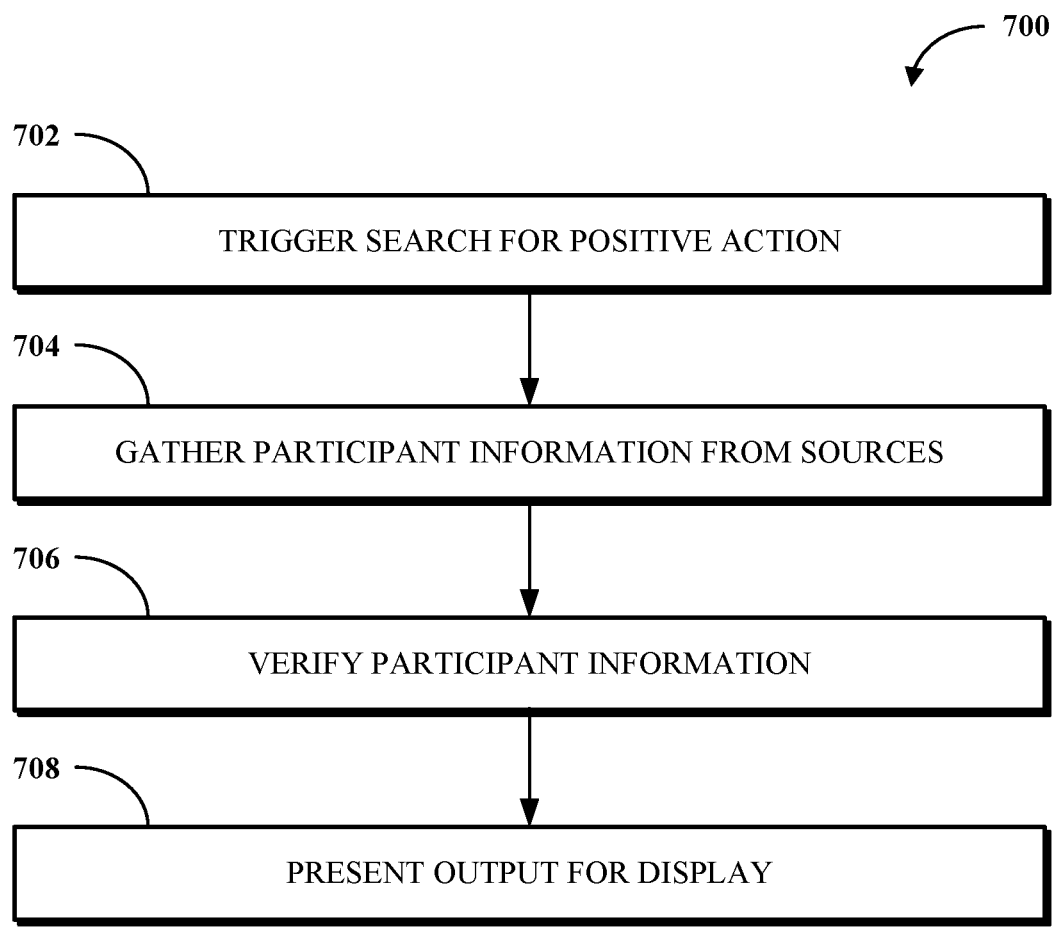
FIG. 7 is a flowchart of an example of a technique for automatically generating event participant information.

To further describe some implementations in greater detail, reference is next made to examples of techniques which may be performed by or using a system for automatically generating event participant information. FIG. 7 is a flowchart of an example of a technique 700 for automatically generating event participant information. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a positive action is received from a participant with respect to an event. The positive action triggers a search for information associated with the participant. In some implementations, the positive action can be an acceptance to an invitation to the event, a registration for the event, the scheduling of the event, or combinations thereof. In some implementations, the participant can be, but is not limited to, an event organizer, a host, attendees, a professor, a student, registrants, or other similarly situated users. In some implementations, the information is participant information and can be or otherwise correspond to, but is not limited to, current company, past companies, education and degrees, contact information, location, title, role, picture or photograph, profile information, hobbies, interests, board memberships, member organizations, professional organizations, and combinations thereof. In some implementations, the information is company information which can be related to a company which is organizing or hosting the event. In this instance, the information can be, but is not limited to, logos, location, offices, stock information, an About profile, management, or combinations thereof. In some implementations, a negative action can be received from a participant. In this instance, technique 800 in FIG. 8 may be implemented as described herein.

At 704, the participant information, company information, or combinations thereof are gathered from resources including, but not limited to, public resources, private resources, system resource, or combinations thereof ("gathered information"). The resources used for the search can be selective or directed based on the participant, the company, or combinations thereof. Certain resources can be excluded due to the nature of the resource, privacy related issues, security related issues, law enforcement related issues, reliability of resource, accuracy of resource, or combinations thereof. Machine learning techniques can be applied to define an appropriate set of resources. Receipt of authorization is reviewed for the private resources.

At 706, the gathered information is processed for consistency and accuracy. This verification or resolving of the information includes parsing the gathered information for terms correlated to or associated with categories or types. Each category can result in having multiple terms that define the participant or company. These multiple terms are reconciled using a variety of techniques as described herein. The resources that are associated with reliable and accurate terms are identified and are used to refine the resources used for the searching. For example, some resources can be given more weight with respect to their search results in contrast to other resources. In some implementations, these intermediate verified or resolved information can be sent to an event organizer for confirmation or override with respect to categories having conflicts. In some implementations, these intermediate verified or resolved information can be sent to an event organizer for confirmation or override prior to distribution to the participants. The override feature adds a layer of verification with respect to the intermediate verified or resolved information to catch anomalies such as name and address spelling variations, for example.

At 708, the verified information is processed for distribution to the participant. In some implementations, the verified information is transmitted for display at a client device associated with a participant. The transmission of the information can be done using a number of techniques, including but not limited to, messaging services, an updated invitation, via the conferencing software during the event, or combinations thereof. In some implementations, the verified information is automatically formatted for export to resources associated with the participant. In some implementations, the verified information is automatically formatted for export and updating of the system resources. In some implementations, the verified information is used for updating event materials related to the event. For example, information related to a hosting company is automatically populated or made available for use with pulldown menu insertion.

Figure 8:
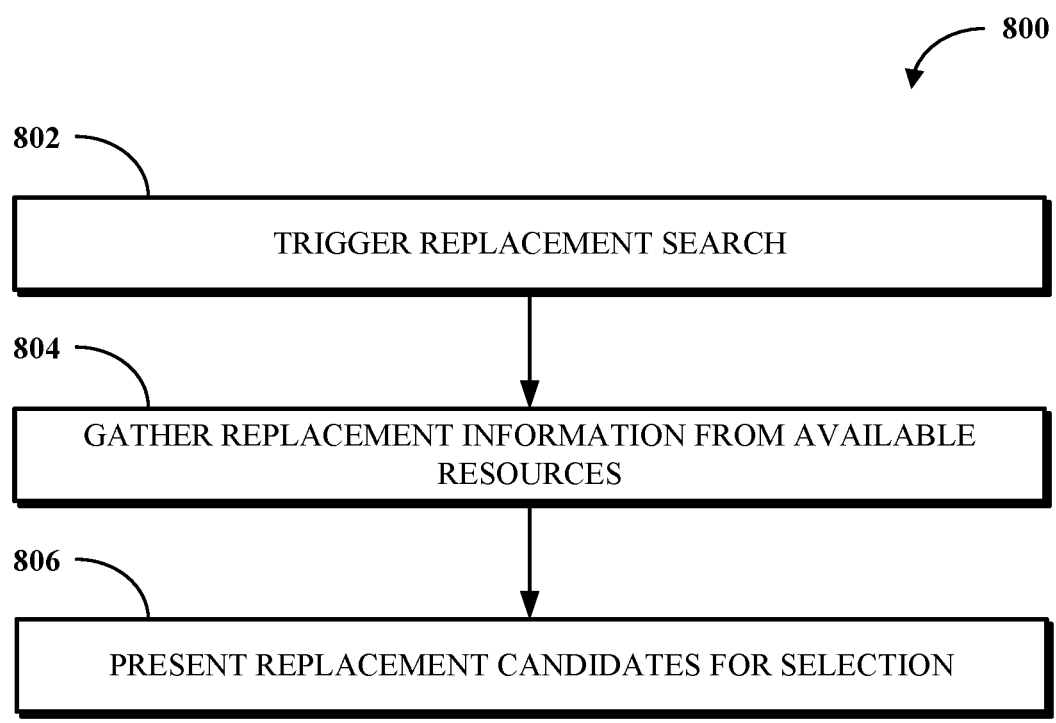
FIG. 8 is a flowchart of an example of a technique for automatically determining a replacement participant.

To further describe some implementations in greater detail, reference is next made to examples of techniques which may be performed by or using an automatically generating event participant information. FIG. 8 is a flowchart of an example of a technique 800 for generating a replacement participant. The technique 800 can be executed using computing devices, such as the systems, hardware, and software described with respect to FIGS. 1-6 and in concert with the technique 700 of FIG. 7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a negative action is received from a participant with respect to an event. The negative action triggers a search for a replacement participant. In some implementations, the negative action can be a rejection to an invitation sent for an event. In some implementations, the negative action can be a presenter having to opt out due to unforeseen circumstances.

At 804, replacement information is gathered to determine candidate replacement participants. In some implementations, a message associated with the negative action is parsed and analyzed for possible reference to a replacement name. In some implementations, system resources and public resources are searched to match information available for the participant sending the negative action. Matching criteria can include, but is not limited to, role, company, position, title, or combinations thereof. In some implementations, inconsistencies in the replacement information can be verified or resolved using the techniques described herein.

At 806, a set of replacement candidates are determined and sent to an event organizer, for example. The event organizer can transmit an invitation to a replacement candidate based on the text in the negative action and the information gathered from the available resources. Acceptance by the replacement candidate can trigger the technique 700 of FIG. 7.

Some implementations may include a method that includes triggering a search for participant information for a participant when a positive action for an event is received from a client device associated with the participant. The method may include gathering the participant information from at least one of public, private, or system resources. The method may include resolving consistency of the gathered participant information from the at least one of public, private, or system resources. The method may include transmitting the resolved participant information to client devices for display, the client devices associated with participants providing positive actions for the event. In one or more implementations, the method may include transmitting the resolved participant information to a client device associated with an event organizer for the event. In one or more implementations, the method may include receiving permission from the client device associated with the participant to access a private resource associated with the participant. In one or more implementations, the method may include formatting the resolved participant information for export to private resources associated with an event organizer and the participant. In one or more implementations, gathering information about the attendee from public and private resources may include optimizing which of the public, private, or system resources to search based on accuracy, reliability, and relevancy of the participant information. In one or more implementations, the method may include certain of the public resources are excluded based on at least one of privacy or law enforcement issues. In one or more implementations, the method may include gathering company information from at least one of the public, private, or system resources, the company information for a company associated with the event. In one or more implementations, the method may include populating event materials from resolved company information, the resolved company information for a company associated with the event. In one or more implementations, the method may include overriding, by an event organizer, intermediate resolved participant information due to inaccurate information. In one or more implementations, the method may include processing a negative action for the participant. In one or more implementations, the method may include gathering replacement participant information on replacement participants from at least one of the public, private, or system resources. In one or more implementations, the method may include determining one or more replacement participants for the participant based on the negative action and the gathered replacement participant information on the replacement participants. In one or more implementations, the method may include transmitting the one or more replacement participants to a client device associated with an event organizer. In one or more implementations, the method may include that the positive action is one of an acceptance to an invitation to the event or a registration for the event. In one or more implementations, resolving consistency of the gathered participant information from at least one of the public, private, or system resources may include placing terms in the gathered participant information into categories and applying rules to reconcile multiple terms when present in a category.

In some implementations, an apparatus may include a memory and a processor. The processor is configured to execute instructions stored in the memory to trigger a search for participant information for a participant when a positive action for an event is received from a client device associated with the participant, gather the participant information from at least one of public, private and software platform resources, resolve consistency of the gathered participant information from the at least one of public, private, or apparatus resources, and transmit the resolved participant information to client devices for display, the client devices associated with participants providing positive actions for the event. In one or more implementations, the processor is configured to execute the instructions to transmit the resolved participant information to a client device for display, the client device associated with an event organizer for the event. In one or more implementations, the processor is configured to execute the instructions to receive permission from the participant to access a private resource associated with the participant and format the resolved participant information for export to private resources associated with an event organizer and the participant. In one or more implementations, the processor is configured to execute the instructions to gather company information from at least one of public, private, or apparatus resources, the company information for a company associated with the event and populate event materials from resolved company information. In one or more implementations, the processor is configured to execute the instructions to process a negative action for the participant, gather replacement participant information on replacement participants from at least one of public, private, or apparatus resources, determine one or more replacement participants for the participant based on the negative action and the gathered replacement participant information on the replacement participants, and transmit the one or more replacement participants to an event organizer.

In some implementations, a non-transitory computer readable medium storing instructions operable to cause one or more processors to perform operations comprising triggering a search for participant information for a participant when a positive action for an event is received from a client device associated with the participant, gathering the participant information from at least one of public, private and software platform resources, resolving consistency of the gathered participant information from the at least one of public, private, or system resources, and transmitting the resolved participant information to client devices for display, the client devices associated with participants providing positive actions for the event. In one or more implementations, the processor is configured to execute the instructions to perform operations comprising processing a negative action for the participant, gathering replacement participant information on replacement participants from at least one of public, private, or system resources, determining one or more replacement participants for the participant based on the negative action and the gathered replacement participant information on the replacement participants, and transmitting the one or more replacement participants to an event organizer. In one or more implementations, the processor is configured to execute the instructions to perform operations comprising gathering company information from at least one of public, private, or system resources, the company information for a company associated with the event and populating event materials from resolved company information.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   for a positive action:
   triggering automated search for participant information for a participant when the positive action for an event is received from a client device associated with the participant;
   automatically gathering the participant information from public, private, and system resources in response to the triggered automated search;
   automatically reviewing the gathered participant information from the automated search for inconsistencies and issues;
   automatically resolving consistency of the gathered participant information from the public, private, and system resources based on the automated review of the gathered participant information; and automatically transmitting the resolved participant information to client devices for display, the client devices associated with participants providing positive actions for the event; and for a negative action:

processing the negative action for the participant;

parsing the negative action for replacement participants;

gathering replacement participant information on replacement participants from the public, private, and system resources;

determining one or more replacement participants for the participant based on the parsed negative action and the gathered replacement participant information on the replacement participants; and automatically transmitting the one or more replacement participants to a client device associated with an event organizer.

2. The method of claim 1, further comprising:

transmitting the resolved participant information to a client device associated with an event organizer for the event.

3. The method of claim 1, further comprising:

receiving permission from the client device associated with the participant to access a private resource associated with the participant.

4. The method of claim 1, further comprising:

formatting the resolved participant information for export to private resources associated with an event organizer and the participant.

5. The method of claim 1, wherein automatically gathering information about the participant from public and private resources comprises:

optimizing which of the public, private, and system resources to search based on accuracy, reliability, and relevancy of the participant information.

6. The method of claim 1, wherein certain of the public resources are excluded based on at least one of privacy or law enforcement issues.

7. The method of claim 1, further comprising:

gathering company information from the public, private, and system resources, the company information for a company associated with the event.

8. The method of claim 1, further comprising:

populating event materials from resolved company information, the resolved company information for a company associated with the event.

9. The method of claim 1, further comprising:

overriding, by an event organizer, intermediate resolved participant information due to inaccurate information.

10. The method of claim 1, wherein the negative action is based on a missing reply for the event.

11. The method of claim 1, wherein the positive action is one of an acceptance to an invitation to the event or a registration for the event.

12. The method of claim 1, wherein automatically resolving consistency of the gathered participant information from the public, private, and system resources comprises:

placing terms in the gathered participant information into categories; and applying rules to reconcile multiple terms when present in a category.

13. An apparatus, comprising:

a memory; and a processor configured to execute instructions stored in the memory to:

for a positive action:

trigger an automated search for participant information for a participant when the positive action for an event is received from a client device associated with the participant;

automatically gather the participant information from public, private, and software platform resources in response to the triggered automated search;

automatically review the gathered participant information from the automated search for inconsistencies and issues;

automatically resolve consistency of the gathered participant information from the public, private, and software platform resources based on the automated review of the gathered participant information; and automatically transmit the resolved participant information to client devices for display, the client devices associated with participants providing positive actions for the event; and for a negative action:

process a negative action for the participant;

parsing the negative action for replacement participants;

gather replacement participant information on replacement participants from the public, private, and software platform resources;

determine one or more replacement participants for the participant based on the parsed negative action and the gathered replacement participant information on the replacement participants; and automatically transmit the one or more replacement participants to an event organizer.

14. The apparatus of claim 13, wherein the processor is configured to execute the instructions to:

transmit the resolved participant information to a client device for display, the client device associated with an event organizer for the event.

15. The apparatus of claim 13, wherein the processor is configured to execute the instructions to:

receive permission from the participant to access a private resource associated with the participant; and format the resolved participant information for export to private resources associated with an event organizer and the participant.

16. The apparatus of claim 13, wherein the processor is configured to execute the instructions to:

gather company information from the public, private, and software platform resources, the company information for a company associated with the event; and populate event materials from resolved company information.

17. The apparatus of claim 13, wherein the processor is configured to execute the instructions to:

identify the negative action based on a missing reply to the event.

18. A non-transitory computer readable medium storing instructions operable to cause one or more processors to perform operations comprising:

for a positive action:

triggering an automated search for participant information for a participant when the positive action for an event is received from a client device associated with the participant;

automatically gathering the participant information from public, private, and software platform resources in response to the triggered automated search;

automatically reviewing the gathered participant information from the automated search for inconsistencies and issues;
automatically resolving consistency of the gathered participant information from the public, private, and software platform resources based on the automated review of the gathered participant information; and
automatically transmitting the resolved participant information to client devices for display, the client devices associated with participants providing positive actions for the event; and
for a negative action:
processing the negative action for the participant;
parsing the negative action for replacement participants;
gathering replacement participant information on replacement participants from the public, private, and software platform resources;
determining one or more replacement participants for the participant based on the parsed negative action and the gathered replacement participant information on the replacement participants; and
automatically transmitting an invitation to the one or more replacement participants.

19. The non-transitory computer readable medium of claim 18, wherein the negative action is based on a missing reply for the event.

20. The non-transitory computer readable medium of claim 18, wherein the one or more processors is configured to execute the instructions to perform operations comprising:
gathering company information from the public, private, and software platform resources, the company information for a company associated with the event; and
populating event materials from resolved company information.

* * * * *